METHOD AND MEANS FOR REDUCING KINESCOPE MISREGISTRATION

Filed Feb. 14, 1964

INVENTOR.
Sholly Kagan
BY
Brown and Mikulka
and
Donald M. Sandler
ATTORNEYS

METHOD AND MEANS FOR REDUCING KINESCOPE MISREGISTRATION

Filed Feb. 14, 1964 2 Sheets-Sheet 2

INVENTOR.
Sholly Kagan

BY Brown and Mikulka
and
Donald M. Sandler
ATTORNEYS 3,284,662

METHOD AND MEANS FOR REDUCING KINESCOPE MISREGISTRATION

Sholly Kagan, Natick, Mass., assignor to Polaroid Corporation, Cambridge, Mass., a corporation of Delaware
Filed Feb. 14, 1964, Ser. No. 344,914
16 Claims. (Cl. 315—17)

Figure 1:
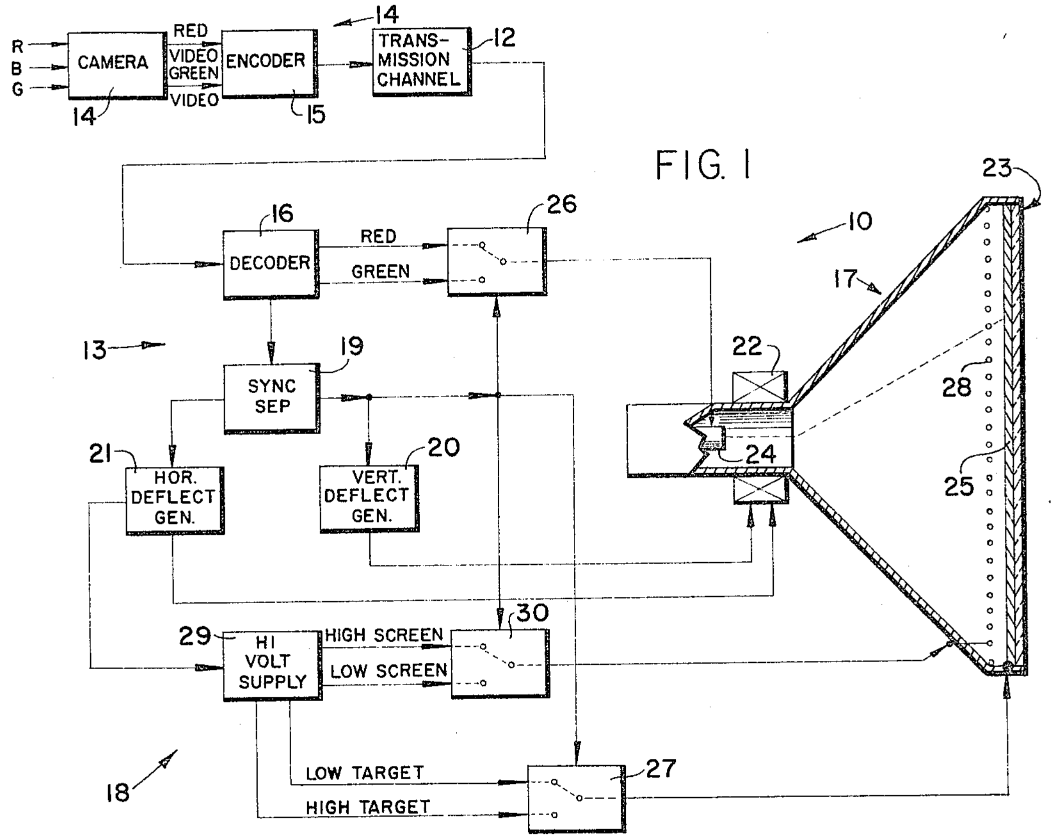

This invention relates to color television receivers, and more particularly to a color television receiver of the type which utilizes a viewing screen made up of a plurality of superposed layers of luminescent material.

It is well known that the depth of penetration of an electron beam into cathodoluminescent material is directly related to the kinetic energy of the electrons, so that if a thin film of such material is intercepted by a beam of electrons, penetration can be varied from zero to 100% by varying the electron energy. It has been found that the radiant output of the material increases as the beam penetrates further into the material, reaches a maximum at full penetration, and then decreases as electrons completely penetrate the material at increasing velocities. The energy at which the radiant output is a maximum is directly related to the thickness of the film. Where a plurality of superposed layers are present, selective excitation thereof can be achieved by selective control of the accelerating potential applied to the electron gun.

This approach has been utilized in color kinescopes by providing, on a viewing screen, a plurality of superposed layers of luminescent material, each of which emits a different characteristic color used for color analysis. Using the conventional three-color system of color analysis, for example, the viewing screen would have superposed red, blue and green light-emitting layers. During one frame, the accelerating voltage would be held at a low value to cause substantial excitation of the layer closest to the gun while the beam intensity would be modulated in accordance with the video signal derived from the scan of the color-separation image having the same color as the color of the light emitted by the closest layer. During the next frame, the accelerating voltage would be held at an intermediate value to cause substantial excitation of only the intermediate layer while the beam intensity would be modulated in accordance with the video signal derived from the scan of the color-separation image having the same color as the intermediate layer, etc. In this manner, red, blue and green color-separation images of the scene being televised are sequentially reproduced on the viewing screen at the frame frequency to produce a composite picture in full color.

Early in the development of television receivers of the type described, those skilled in the art recognized that the modulation of the accelerating voltage is accompanied by an inverse modulation in the raster size. That is to say, if the input of the deflection means of the kinescope is such as to cause the beam to be inclined from the axis of the gun at a given angle when the accelerating voltage has one value, an increase in the voltage causes the inclination of the beam to be reduced. Thus, the modulation of the accelerating voltage to reproduce the desired color-separation images on the viewing screen also causes misregistration between the images. One manner in which the misregistration problem can be reduced is to provide, between the viewing screen and the gun, an electron permeable grid as close as possible to the screen, and to hold the grid at a constant voltage. This has the effect of shielding the electrons from the effect of the voltage on the screen while they are in the region between the gun and the grid. As a result, under different accelerating voltages, the trajectories followed by electrons in such region to reach a given picture element on the screen are substantially coincident, and the terminal energy to excite the desired layer on the screen is attained by the electrons by applying the proper voltage to the screen. Since the spacing between the grid and the screen is so small, changes in the screen voltage should exert little effect on the direction of the electrons as the latter pass between the grid and the screen. It has been found, however, that even with this approach there is a residual amount of misregistration present which has a deleterious effect on the fidelity with which the televised scene is reproduced. As a result, it has been suggested in the prior art that this residual misregistration can be reduced by modifying, also, the sweep control signal such that the trajectories of electrons in the region between the gun and the grid and associated with a given picture element are made sufficiently different to just compensate for the slight change in direction of the electrons in the region between the grid and the screen arising from the modulation of the voltage on the screen. While this would, in theory, provide a convenient solution to the misregistration problem, so far as is known, a practical, inexpensive circuit for changing the slope of the sweep control signal in synchronism with changes in the accelerating voltage, is not available.

It is therefore the primary object of the present invention to reduce residual misregistration in a manner analogous to the manner in which such misregistration is reduced by proper modification of the sweep control signal, but without the necessity for such modification.

As one feature of this invention whereby the object thereof is achieved, the voltage on the grid adjacent the screen is modulated in synchronism but 180° out-of-phase with the modulation of the voltage on the screen. As a result, electrons in the region between the gun and the grid are caused to follow different trajectories in reaching the same picture element on the viewing screen even though the sweep control signal remains the same. In this manner, the different changes in direction of the beam as it passes between the grid and the screen and due to the modulation of the screen voltage is just compensated for, and residual misregistration is substantially eliminated. A still further feature of this invention involves maintaining the voltage on the grid at a value that is always lower than the value of the voltage on the screen.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIGURE 1 is a block diagram of a television system including a color kinescope, operating on the red-white system of color analysis, into which the present invention is incorporated; and FIGS. 2, 3, 4 and 5 are enlargements of a section of the kinescope shown in FIGURE 1 for the purpose of illustrating the effect on electron trajectories of various types of relative voltages applied to a grid placed adjacent to the target screen.

The present invention is illustrated in a color television system which utilizes the red-white system of color analysis disclosed in application Serial No. 297,341, filed July 24, 1963, and assigned to the same assignee as the present application, although it should be understood that the present invention is also applicable to a color television system which utilizes the more conventional red-blue-green system of color analysis such as disclosed and claimed in U.S. Patent No. 2,566,713 to Zworykin granted September 4, 1951. In the red-white system of color analysis, only two color-separation images of the scene being televised are necessary: namely the red and the green, or the relatively long and relatively short dominant wavelength color-separation images. The red and green video signals, individually characterizing the red and green color-separation images, can be used to sequentially modulate a single electron beam such that the red color-separation image is reproduced on a viewing screen in red light (that need not necessarily match the color of the red color-separation image), and the green color-separation image is reproduced in achromatic or white light. A viewer of the sequential reproduction of the red and green images in red and achromatic light respectively sees the scene being televised in full color even though each picture element of the viewing screen emits only red or achromatic light.

A television system based on the above-described system of color analysis is shown in block diagram form in FIGURE 1 and designated by reference numeral 10. System 10 includes transmitting apparatus 11, transmission channel 12 and receiver apparatus 13. Transmitting apparatus 11 is constituted by camera 14, which views the scene being televised separating at least the red and green components, and producing at least a red and a green video signal which is applied to encoder 15 preparatory to transmission to receiver apparatus 13. Encoder 15, by conventional means (not shown), adds the synchronizing information to the two channels carrying the video signals and prepares the latter for application to transmission channel 12. The latter may be an RF link or a coaxial cable depending upon factors not related to the present invention.

Receiver apparatus 13 includes decoder 16, bi-color kinescope 17 and receiver circuitry 18. Decoder 16 operates on the signals furnished by transmission channel 12 to recover the red and green video signals, which, it will be recalled, are independent signals individually characterizing the red and green color-separation images of the scene being televised. Decoder 16 also applies the synchronizing information to conventional sync separator 19 which supplies the vertical sync pulses to vertical deflection generator 20 and the horizontal sync pulses to horizontal deflection generator 21. Generators 20 and 21 produce outputs which are applied to deflection means 22 of kinescope 17, the latter including at one end, a viewing screen 23 that acts as a target for a beam of electrons produced by electron gun means 24 at the other end of the kinescope. As a result of the periodic deflection signals, the electron beam is caused to scan the target in accordance with the deflection signals to define a conventional raster. Screen 23 may be constructed in the form of two superposed layers of cathodoluminescent material 25, one of which emits red light and the other of which emits minus-red light under electron excitation. When the red light-emitting layer is closer to the electron gun, the screen will emit only red light if the kinetic energy of electrons impacting the screen has some lower value such that penetration is limited to this layer. Thus, a portion of the red color-separation image can be reproduced on the screen by modulating the intensity of the beam with the red video signal during a portion of the periodic scan of the screen by the beam. However, the screen will emit achromatic or white light if the kinetic energy of electrons impacting the screen has some higher values such that the beam penetrates both the red and the minus-red layer and excites both to substantially the same degree. Thus, a portion of the green color-separation image can be reproduced on the screen by modulating the intensity of the beam with the green video signal during another portion of the periodic scan of the screen. When one field of the raster is in red light and the other field is in achromatic light, a satisfactory reproduction of the scene in full color is achieved.

To this end, the vertical sync pulses, which appear at the field frequency may be utilized to synchronously control two electronic switches, designated schematically at 26 and 27. Switch 26 is associated with the two video outputs of decoder 16 and applies only one of such outputs at a time to the control grid of electron gun means 24 whereby the intensity of the beam can be modulated by either the red or green video signals. Switch 27, on the other hand, is associated with high-voltage supply 29 which is entirely conventional in that it is associated with the horizontal sweep circuit, except that extra windings are provided by which intermediate voltages are made available. In particular, a relatively high voltage and a lower voltage (whose orders of magnitude are 15,000 to 10,000 volts respectively) are available to be applied via switch 27 to a conductive layer (not shown) on material 25, the relatively high voltage causing simultaneous excitation of both layers of the screen and producing white light, and the lower voltage causing excitation of only the layer closest to the gun and producing red light. Switches 26 and 27 are synchronized so that when the red video signal is applied to the control grid of the electron gun means of the kinescope, the lower target voltage is applied to the target; and when the green video signal is applied to the control grid, the higher target voltage is applied to the target.

While the above-described apparatus presents the two colors on a field sequential basis wherein the lines of the raster associated with one field scan are always red and the lines of the next field scan are always achromatic, the present invention is applicable to any other system of presentation such as frame sequential. However, the misregistration problem inherent in any system wherein the accelerating voltage is modulated is not altered by limiting this description to the field sequential presentation described above. Basically, the problem is that modulation of the accelerating voltage to achieve selective color control results in modulation of the raster size. In other words, the field reproduced in white light (requiring the higher target voltage) will be smaller in area than the field reproduced in red light (requiring the lower target voltage). Grid 28, interposed between gun means 24 and material 25 on the screen and close to the latter serves to reduce the misregistration. Before explaining how the present invention operates to practically eliminate residual misregistration, it will be helpful to review the effect of the grid when operated in accordance with the prior art.

Figure 2:
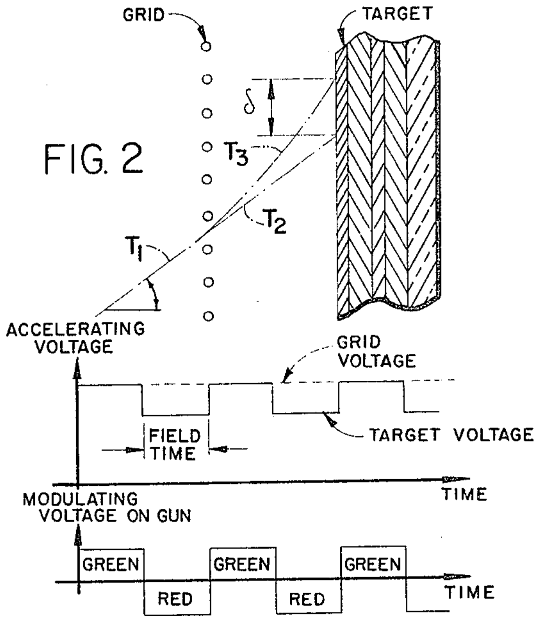

Referring now to FIG. 2, the trajectories of the electron beam under two different potentials on the target screen is shown, when the grid is maintained at the higher of the two potentials. This expedient prevents secondary electrons produced when the beam impacts the grid from causing spurious lighting effects on the target screen. When electrons are in the region between the gun and the grid, the trajectory is determined almost entirely by the voltage on the grid and the input to the deflection means, and the voltage on the target screen, which determines the energy of the electrons impacting the target screen, has little effect on the trajectory. Thus, regardless of the target voltage, a given input to the deflection means of the kinescope may result in a trajectory making an angle $\theta$ with the axis of the gun. If the voltage on the target screen is at the higher of the two accelerating voltages, electrons will drift between the grid and the target in a straight line coincident with the trajectory existing in the region between the gun means and the grid. If the voltage on the target is at the lower of the two accelerating voltages, electrons will be retarded after passing through the grid and will traverse a parabolic path, being bent away from the normal to the grid. The displacement $\delta$ between the two points of impact, resulting from the paths $T_2$ and $T_3$, represents the residual misregistration and is generally quite small when the distance from the grid to target is small.

A disadvantage of this conventional approach is the electrostatic force between the target and the grid arising as the target voltage is modulated and the grid voltage is held constant. Such force is one of attraction during one field scan when the target voltage has its lower value, and zero during the next field scan when the target voltage has its higher value. Thus, the screen is attracted toward the target during one field scan, released at the start of the next, then attracted, etc. This mechanical vibration imposes severe strains on the grid and prevents it from being placed close enough to the target to achieve a significant reduction in the residual misregistration.

Figure 3:
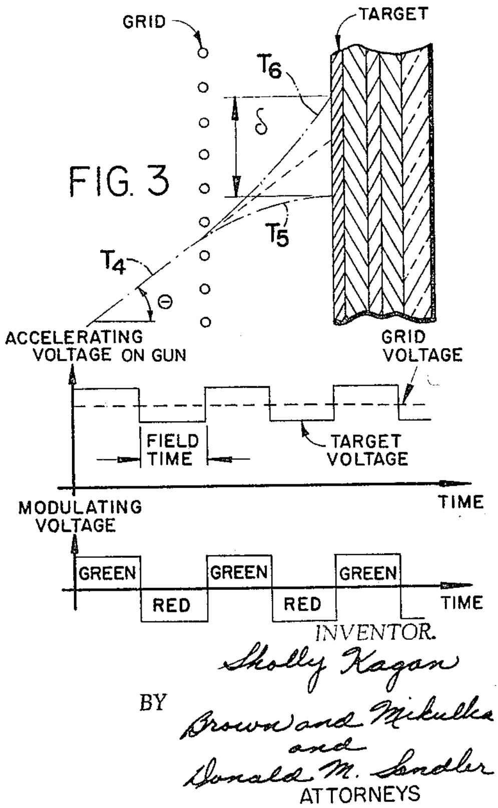

The periodic attraction and release of the grid can be eliminated by fixing the voltage on the grid at the average value of the modulating voltage applied to the target. FIG. 3 illustrates this approach, and in particular shows the effect on the displacement $\delta$. Thus, for a given input to the deflection means of the kinescope, the trajectory $T_4$ of electrons in the region between the gun and the grid may make an angle $\theta$ with the axis of the gun. When the voltage on the target screen is at the higher of the two accelerating voltages, electrons passing through the grid will be accelerated and the path $T_5$ in the region between the grid and the target will be parabolic and bent toward the normal to the screen. When the voltage on the target screen is at the lower of the two accelerating voltages, electrons passing through the grid will be decelerated and the path $T_6$ in the region between the grid and the target will be parabolic but bent away from the normal to the screen. Actually, the displacement $\delta$ is not substantially reduced in comparison to its value shown in FIG. 2.

Figure 4:
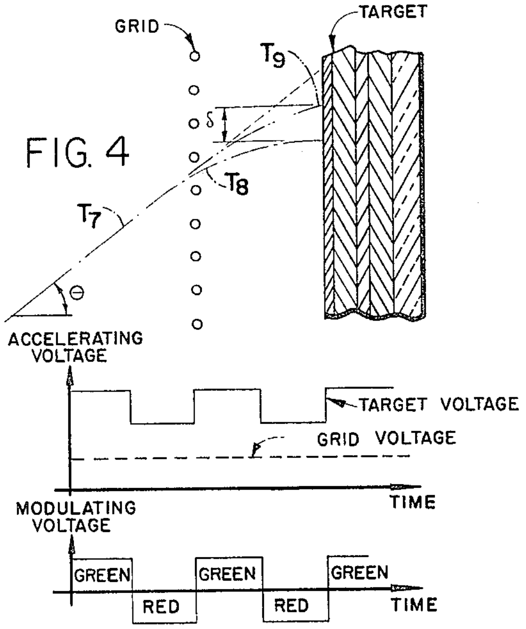

While the displacement $\delta$ tends to remain substantially unchanged as the grid voltage is decreased from a value equal to the larger of the two target modulating voltages to a value equal to the average target modulating voltage, a significant improvement is achieved when the grid voltage is maintained at a value lower than the smaller of the two target modulating voltages. This approach is shown in FIG. 4, where, for a given input to the deflection means of the kinescope, the trajectory $T_7$ of electrons in the region between the gun and the grid makes an angle $\theta$ with the axis of the gun. In this case, electrons passing through the grid will follow a path in the region between the grid and the target that is parabolic and bent towards the normal to the screen, regardless of which of the two target modulating voltages is present on the target. When the modulating voltage is at the higher value, the path $T_8$ is bent more towards the normal than when the modulating voltage is at the lower value, during which time the path is shown at $T_9$. Thus, it can be seen from FIG. 4 that the displacement $\delta$ tends to be decreased in comparison to the displacement associated with the techniques shown in FIGS. 3 and 4.

Figure 5:
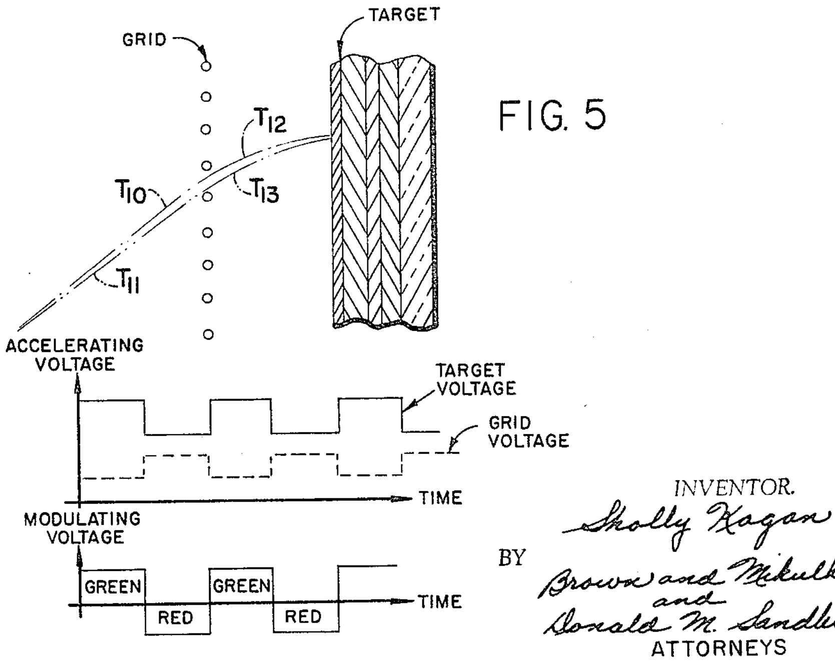

Having thus described one aspect of the invention, it can now be appreciated how the primary object of the invention is achieved. Referring now to FIG. 5, it can be seen that an out-of-phase modulation signal on the grid causes the trajectory of electrons in the region between the gun and the grid to be different when the input to the deflection means of the kinescope is the same. The path $T_{10}$ of electrons in the region between the gun and the grid has a greater inclination relative to the axis of the gun than the path $T_{11}$, even when the input to the deflection means of the kinescope remains fixed because the grid voltage associated with path $T_{10}$ is less than the grid voltage associated with path $T_{11}$. Electrons that follow the path $T_{10}$ in the region between the gun and the grid are bent more toward the normal to the grid after passing therethrough (and follow path $T_{12}$) than are electrons that follow the path $T_{11}$ in the region between the gun and the grid and pass through the grid (following path $T_{13}$). This situation arises because the target voltage is held at its higher modulating value when the grid voltage is held at its lower modulating value. Thus, the trajectory followed by electrons in the region between the gun and the grid can be controlled by the grid voltage in order to just compensate for the change in trajectory occurring in the region between the grid and the target due to the modulation of the target voltage. The point of impact of beam $T_{10}$, $T_{12}$ can thus be made identical to the point of impact of beam $T_{11}$, $T_{13}$. Moreover, this is accomplished without necessarily modifying the input sweep generators to make the input to the deflection means of the kinescope dependent upon the target modulating voltage.

In summary, it can be said that the object of the invention is achieved by modulating the voltage on the grid synchronously but out-of-phase with the modulation of the target voltage; the results achieved are enhanced when the voltage on the grid is maintained at a value that is lower than either of the two target modulating voltages. An embodiment of this invention is shown in FIGURE 1 where high voltage supply 29 is so constructed as to have available at least two grid modulating voltages, both of which are lower than the lower of the two target modulating voltages. For example, the grid modulating voltages may have orders of magnitude of about 5400 and 6600 volts respectively. Associated with the two grid modulating voltages is electronic switch 30, which controls the application of these voltages to grid 28, and is synchronized by the vertical sync pulses with the operation of switches 26 and 27. The synchronization is in accordance with the following chart.

| Video Signal | Target Voltage | Grid Voltage |
|---|---|---|
| Green | High | Low. |
| Red | Low | High. |

While field sequential switching is disclosed, it is obvious that the above-described device is capable of line, dot or frame sequential switching if so desired.

Since certain changes may be made in the above method and means without departing from the scope of the invention herein involved, it is intended that all matter contained in the above description or shown in the accompanying drawings shall be interpreted as illustrative and not in a limiting sense.

What is claimed is:

1. A method for reducing misregistration between a pair of images sequentially formed on a kinescope target by an electron beam that periodically scans said target where one of said pair of images is formed when said target is held at a first potential relative to the gun producing said beam during a portion of the periodic scan thereof and the other of said pair of images is formed when said target is held at a second potential, lower than said first potential, relative to said gun during another portion of said periodic scan, and where an electron permeable grid is interposed between said gun and said target, including the step of maintaining a voltage on said grid relative to said gun that is always lower than either said first or second potentials.

2. The method of claim 1 including the further step of modulating the voltage on said grid.

3. The method of claim 1 including the further step of modulating the voltage on said grid between a first value when said target is held at said first potential, and a second value, higher than said first value, when said target is held at said second potential.

4. A method for reducing misregistration between a pair of images sequentially formed on a kinescope target by an electron beam that periodically scans said target where one of said pair of images is formed when said target is held at a first potential relative to the gun producing said beam during a portion of the periodic scan thereof and the other of said pair of images is formed when said target is held at a second potential, lower than said first potential, relative to said gun during another portion of said periodic scan, and where an electron permeable grid is interposed between said gun and said target, including the step of modulating the voltage on said grid between a first value when said target is held at said first potential, and a second value, higher than said first value, when said target is held at said second potential.

5. A television receiver comprising:
(a) a kinescope including a target; an electron gun for producing a beam of electrons focused on said target; deflection means for causing said beam to define a raster on said target; and a grid interposed between said gun and said target;
(b) said target being constructed and arranged to produce different types of light in response to the modulation of the voltage on said target relative to said gun between a first value and a lower second value; and
(c) means for causing the voltage on said grid relative to said gun to be less than either said first or second values.

6. A television receiver in accordance with claim 5 wherein said last-named means is constructed and arranged to modulate the voltage on said grid.

7. A television receiver in accordance with claim 5 wherein said last-named means is constructed and arranged to modulate the voltage on said grid in synchronism with modulation of the voltage difference between said gun and said target.

8. A television receiver in accordance with claim 5 wherein said last-named means is constructed and arranged to modulate the voltage on said grid in synchronism but out-of-phase with modulation of the voltage difference between said gun and said target.

9. A television receiver in accordance with claim 5 wherein said last-named means is constructed and arranged to modulate the voltage on said grid in synchronism but 180° out-of-phase with modulation of the voltage difference between said gun and said target.

10. A television receiver comprising:
(a) a kinescope including a target; an electron gun for producing a beam of electrons focused on said target; deflection means for causing said beam to define a raster on said target; and a grid interposed between said gun and said target;
(b) said target being constructed and arranged to produce different types of light in response to the modulation of the voltage on said target relative to said gun between a first value and a lower second value; and means constructed and arranged to modulate the voltage on said grid.

11. A television receiver in accordance with claim 10 wherein said last-named means is constructed and arranged to modulate the voltage on said grid in synchronism with modulation of the voltage difference between said gun and said target.

12. A television receiver in accordance with claim 10 wherein said last-named means is constructed and arranged to modulate the voltage on said grid in synchronism but out-of-phase with modulation of the voltage difference between said gun and said target.

13. A television receiver in accordance with claim 10 wherein said last-named means is constructed and arranged to modulate the voltage on said grid in synchronism but 180° out-of-phase with modulation of the voltage difference between said gun and said target.

14. A television receiver comprising:
(a) a kinescope including a target; an electron gun for producing a beam of electrons focused on said target; deflection means for controlling the point of impact of said beam on said target, and a grid interposed between said gun and said target;
(b) said target being constructed and arranged so that the type of light produced by the impact of said beam thereon is dependent upon the potential difference between said target and said gun;
(c) deflection generator means for producing periodic deflection signals;
(d) said deflection means of said kinescope being responsive to said deflection signals for causing said beam to scan said target in accordance with said deflection signals;
(e) first switch means for sequentially applying to said target at least two different potentials so that said target is caused to produce sequentially at least two different types of light; and
(f) second switch means for sequentially applying to said grid at least two different voltages relative to said gun.

15. A television receiver in accordance with claim 14 wherein means are provided for synchronizing the operation of said second switch means with the operation of said first switch means so that the potentials on said target and the voltages on said grid are 180° out-of-phase.

16. A television receiver in accordance with claim 15 wherein each of said two different voltages relative to said gun are less than the potential on said target at all times.

References Cited by the Examiner

UNITED STATES PATENTS 3,188,507 6/1965 Law .............. 315—18 X

DAVID G. REDINBAUGH, *Primary Examiner.*

T. A. GALLAGHER, *Assistant Examiner.*